(12) United States Patent
Sarder et al.

(10) Patent No.: US 11,149,630 B2
(45) Date of Patent: Oct. 19, 2021

(54) OIL DRAIN SYSTEM FOR A GENERATOR ENGINE

(71) Applicant: Champion Power Equipment, Inc., Santa Fe Springs, CA (US)

(72) Inventors: Mark J. Sarder, Waukesha, WI (US); Russell J. Dopke, Elkhart Lake, WI (US); Hiroaki Sato, Brookfield, WI (US); Leigh A. Jenison, Hartland, WI (US)

(73) Assignee: Champion Power Equipment, Inc., Sante Fe Springs, CA (US)

( * ) Notice: Subject to any disclaimer, the term of this patent is extended or adjusted under 35 U.S.C. 154(b) by 0 days.

(21) Appl. No.: 16/357,418

(22) Filed: Mar. 19, 2019

(65) Prior Publication Data

US 2019/0338701 A1 Nov. 7, 2019

Related U.S. Application Data (60) Provisional application No. 62/667,756, filed on May 7, 2018.

(51) Int. Cl.
| | |
|---|---|
| *F02B 43/08* | (2006.01) |
| *F02B 63/04* | (2006.01) |
| *F01M 11/04* | (2006.01) |

(52) U.S. Cl.
CPC ....... *F02B 63/048* (2013.01); *F01M 11/0408* (2013.01); *F02B 63/042* (2013.01); *F01M 2011/0416* (2013.01); *F02B 2063/045* (2013.01)

(58) Field of Classification Search
CPC .... F02B 63/044; F01M 11/0408; F01M 11/04
USPC .............................................................. 123/3
See application file for complete search history.

(56) References Cited

U.S. PATENT DOCUMENTS

| | | | |
|---|---|---|---|
| 4,608,946 A | 9/1986 | Tanaka et al. | |
| 4,702,201 A | 10/1987 | Odo et al. | |
| 4,922,554 A * | 5/1990 | Hwang | E03C 1/284 |
| | | | 137/247.49 |

(Continued)

FOREIGN PATENT DOCUMENTS

| | | |
|---|---|---|
| CN | 1800600 A | 7/2006 |
| CN | 2890369 Y | 4/2007 |

(Continued)

*Primary Examiner* — Logan M Kraft
*Assistant Examiner* — James J Kim
(74) *Attorney, Agent, or Firm* — Ziolkowski Patent Solutions Group, SC (57) ABSTRACT

A standby generator having an engine with oil drain tube that facilitates removal of engine oil from the standby generator is disclosed. The standby generator includes an enclosure comprising a plurality of sidewalls, with an opening formed in one of the sidewalls, and an engine positioned within the enclosure. The engine further includes an oil drain and an oil drain tube having a first end coupled to the oil drain and a second end that opens and closes to selectively drain oil from the engine, the oil drain tube being positionable so as to extend out through the opening. The opening in the one of the sidewalls is lower than the oil drain, such that the oil drain tube is positioned with a downward angle when extending from the oil drain and out of the enclosure through the opening.

22 Claims, 6 Drawing Sheets

(56) References Cited

U.S. PATENT DOCUMENTS

| | | | |
|---|---|---|---|
| 5,567,074 A * | 10/1996 | Dovak | F16L 41/08 285/3 |
| 5,899,174 A | 5/1999 | Anderson et al. | |
| 6,028,369 A | 2/2000 | Hirose et al. | |
| 6,331,740 B1 | 12/2001 | Morohoshi et al. | |
| 6,376,944 B1 | 4/2002 | Grizzle, Jr. et al. | |
| 6,489,690 B1 | 12/2002 | Hatsugai et al. | |
| 6,755,704 B1 * | 6/2004 | Leinonen | B63B 34/10 440/88 L |
| 6,784,574 B2 | 8/2004 | Turner et al. | |
| 6,825,573 B2 | 11/2004 | Suzuki et al. | |
| 6,975,042 B2 | 12/2005 | Yamada et al. | |
| 7,537,070 B2 | 5/2009 | Maslov et al. | |
| 7,642,665 B2 | 1/2010 | Konop et al. | |
| 8,899,191 B2 | 12/2014 | Yano et al. | |
| 9,617,951 B2 | 4/2017 | Sotiriades et al. | |
| 2002/0000342 A1 | 1/2002 | Yamada et al. | |
| 2006/0096808 A1 * | 5/2006 | Rosenbaum | F01M 11/0408 184/1.5 |
| 2008/0185801 A1 * | 8/2008 | Gravlin | F04B 39/0033 280/47.11 |
| 2008/0264918 A1 * | 10/2008 | Helf | B23K 9/32 219/133 |
| 2012/0297901 A1 * | 11/2012 | Blundell | H01F 27/14 73/863.41 |
| 2013/0187392 A1 * | 7/2013 | Janscha | H02K 7/1815 290/1 A |
| 2014/0227411 A1 * | 8/2014 | Popeil | A47J 37/1209 426/302 |
| 2015/0059662 A1 * | 3/2015 | Lan | F02B 63/048 123/2 |
| 2015/0063056 A1 * | 3/2015 | Kral | B01F 15/00746 366/110 |
| 2016/0233739 A1 | 8/2016 | Jenison et al. | |
| 2016/0294255 A1 | 10/2016 | Schmit et al. | |
| 2016/0319728 A1 | 11/2016 | Jenison et al. | |
| 2019/0328179 A1 * | 10/2019 | Popeil | A47J 37/1219 |

FOREIGN PATENT DOCUMENTS

| | | |
|---|---|---|
| CN | 204024810 U | 12/2014 |
| CN | 104314676 A | 1/2015 |

* cited by examiner

OIL DRAIN SYSTEM FOR A GENERATOR ENGINE

CROSS-REFERENCE TO RELATED APPLICATION

The present application is a non-provisional of, and claims priority to, U.S. Provisional Patent Application Ser. No. 62/667,756, filed May 7, 2018, the disclosure of which is incorporated herein by reference in its entirety.

BACKGROUND OF THE INVENTION

Embodiments of the invention relate generally to electrical generators and, more particularly, to a standby generator having an engine with oil drain tube that facilitates removal of engine oil from the standby generator.

Electrical generators provide a convenient source of electricity and can be used to produce electricity in locations that do not have access to the utility grid or when outages in the grid occur. For instance, standby generators can produce electrical power automatically upon sensing an interruption in the utility grid. Standby generators often have an alternator driven by an internal combustion engine to produce electrical power for distribution from the generator. The alternator and the engine are typically housed within an enclosure to shelter the generator from weather and to protect people and animals from the generator.

The internal combustion engine operates on a combustible fuel which ignites in one or more cylinders causing translational motion of a piston in each cylinder. The translational motion of each piston is converted to rotational motion by a crankshaft housed in a crankcase of the engine. The crankshaft in turn drives the alternator to generate electricity. Moving parts within the cylinder and crankcase are lubricated with engine oil. In addition to lubrication, engine oil removes heat from the moving parts, improves sealing of piston rings, and cleans the engine from sludge and varnish. Engine oil should be replaced periodically to guard against oil breakdown and to remove contaminants.

Changing engine oil in a standby generator can be time consuming and cumbersome process. The engine may be positioned within the generator enclosure in a location that is difficult to access. For instance, the engine may have an oil drain located behind other generator components that must first be disassembled to reach the oil drain. In addition, the enclosure may not provide sufficient space for an oil pan large enough to catch all of the drained oil. A person reaching for the oil drain may thus have to assume an awkward or unsafe posture, which may result in injury or cause the oil pan to spill during removal from the enclosure.

Therefore, it would be desirable to provide a standby generator having an internal combustion engine with an oil drain system to simplify oil changes. It would be further desirable to provide a standby generator having an enclosure with improved access to change engine oil.

BRIEF DESCRIPTION OF THE INVENTION

Embodiments of the invention are directed to a standby generator having an engine with oil drain tube that facilitates removal of engine oil from the standby generator.

In accordance with one aspect of the invention, a standby generator includes an enclosure comprising a plurality of sidewalls, with an opening formed in one of the sidewalls. The standby generator also includes an engine positioned within the enclosure, the engine comprising an oil drain, and an oil drain tube having a first end coupled to the oil drain and a second end that opens and closes to selectively drain oil from the engine, the oil drain tube being positionable so as to extend out through the opening. The opening in the one of the sidewalls is lower than the oil drain such that the oil drain tube is positioned with a downward angle when extending from the oil drain and out of the enclosure through the opening.

In accordance with another aspect of the invention, a standby generator includes a standby generator enclosure comprising a base, a top, and a plurality of sidewalls extending generally vertically from the base to the top, the enclosure having an opening in one of the sidewalls to receive an oil drain conduit. The standby generator also includes an engine mounted to the base in the enclosure, the engine comprising an oil drain and an oil drain conduit having a first end coupled to the oil drain to receive oil therefrom and a second end moveable between an upper position and a lower position, the upper position located at a height above a maximum oil fill level of the engine and the lower position located at a height lower than the oil drain, with the second end extending out of the enclosure through the opening when in the lower position. The engine also comprises a holding mechanism to selectively hold the oil drain conduit in the upper position.

In accordance with yet another aspect of the invention, an engine assembly includes an engine base and an engine mounted on the engine base. The engine includes an oil drain at a lower end of the engine and a flexible oil tube comprising a first end coupled to receive oil from the oil drain and a second end that opens and closes to selectively drain oil from the engine, wherein the oil tube is flexible between a first position having the second end positioned above a maximum oil level to operate the engine, and a second position having the second end lower than the first end. The engine also includes an oil tube holder coupled to the engine to selectively hold the oil tube in the first position.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

The operating environment of the invention is described with respect to a standby generator. However, it will be appreciated by those skilled in the art that the invention is equally applicable for use with other electrical generators. Moreover, the invention will be described with respect to an internal combustion engine used to drive an alternator to generate electricity for distribution from the standby generator. However, one skilled in the art will further appreciate that the invention is equally applicable for use with internal combustion engines in applications other than for electrical power generation.

Figure 1:
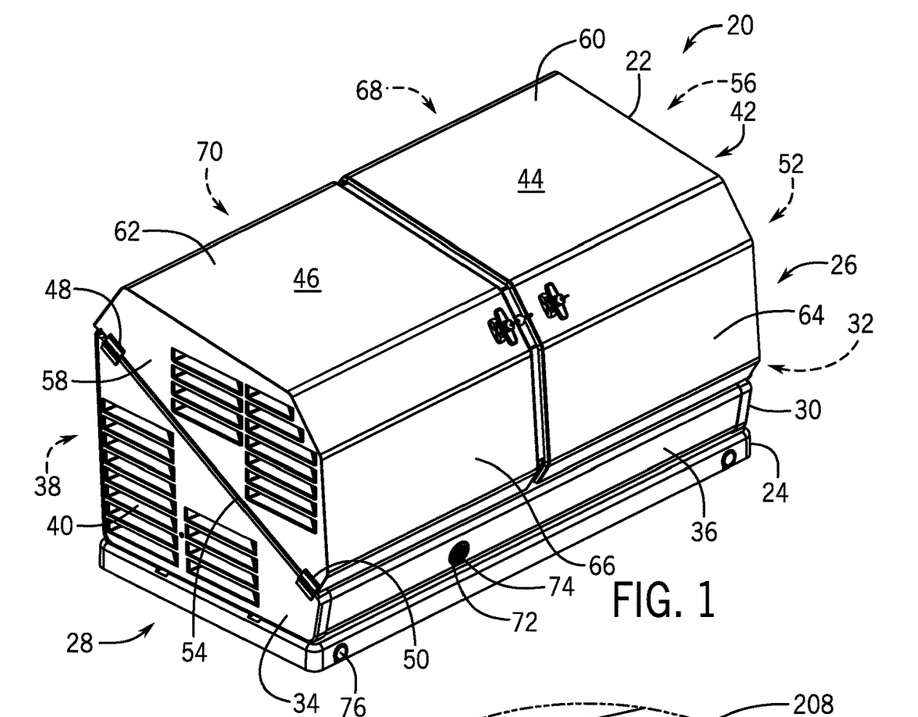
FIG. 1 is a perspective view from the left upper side of an electrical generator, in accordance with an embodiment of the invention.

Referring to FIG. 1, a standby generator 20 is shown in accordance with an embodiment of the invention. The standby generator 20 produces electrical energy and may deliver the electrical energy to a distribution panel of a home, office, shop, business or any other building requiring electricity. The standby generator 20 preferably includes an internal combustion engine and an alternator driven by the internal combustion engine to produce electrical power. The internal combustion engine operates on a fuel source that may include gasoline, diesel, liquefied petroleum gas (LPG), propane, butane, natural gas, or any other fuel source suitable for operating the engine. For instance, the internal combustion engine may comprise a single fuel engine configured to operate on one of the fuels. Alternatively, the engine may comprise a dual fuel or multi-fuel engine configured to switch operation between two or more of the fuel sources. In one embodiment, the engine may comprise a dual fuel engine configured to switch operation between LPG and gasoline, or LPG and diesel. Together, the engine and alternator are referred to as an engine-generator set.

According to an exemplary embodiment of the invention, the standby generator 20 includes an enclosure 22 that provides an outer housing for the standby generator 20. The enclosure 22 includes a base 24 to support the engine-generator set. The base 24 may have a rectangular shape with the shorter ends of the rectangular base defining a first end 26 and a second end 28 of the enclosure 22. The engine-generator set may be mounted to the base 24 in a horizontal crankshaft orientation such that the alternator faces the first end 26 of the enclosure 22 and the engine faces the second end 28 of the enclosure 22. The enclosure 22 may include a plurality of sidewalls 30 extending generally vertically from the base 24 around a perimeter of the standby generator 20. The plurality of sidewalls 30 may include a right sidewall 32 and a left sidewall 34 at respectively the first end 26 and second end 28 of the enclosure 22. The plurality of sidewalls 30 may also include a front wall 36 and a back wall 38 positioned between the right sidewall 32 and left sidewall 34 of the enclosure 22. A plurality of vents 40 may be provided in the first end 26 and the second end 28 to allow airflow into and out of the enclosure 22.

The enclosure 22 may include a top 42 comprising a right hood 44 and a left hood 46. The right hood 44 and the left hood 46, also referred to as enclosure doors, may be coupled to a respective right sidewall 32 and left sidewall 34 via a first hinge 48 and a second hinge 50 for each hood. The first hinges 48 and the second hinges 50 may be coupled along top edges 52, 54 of the respective right sidewall 32 and left sidewall 34. The right hood 44 and the left hood 46 may each have a side panel 56, 58 coupled to one of the first hinges 48 and one of the second hinges 50. The right hood 44 and the left hood 46 may also have a top panel 60, 62 and a front panel 64, 66 coupled to the respective side panel 56, 58. The top panels 60, 62 may be forward sloping to direct rain water off the front of the enclosure 22. The hoods 44, 46 may also have rearward sloping panels 68, 70 to direct rain water off the back of the enclosure. As such, the right hood 44 and the left hood 46 may open about the top edges 52, 54 of the corresponding right sidewall 32 and left sidewall 34 outward beyond the first end 26 and second end 28 of the enclosure 22.

The right hood 44 and the left hood 46 may provide a front cover to the enclosure 22. That is, the front wall 36 may be shorter than the back wall 38 to provide convenient front access into the enclosure 22 upon opening the right hood 44 or the left hood 46. Accordingly, the right sidewall 32 and the left sidewall 34 may include a top edge 52, 54 that slopes forward from the taller back wall 38 to the shorter front wall 36. The first hinge 48 and the second hinge 50 for each hood 44, 46 may be coupled to the respective right sidewall 32 and left sidewall 34 along the forward sloping top edges 52, 54. In this configuration, the right hood 44 and the left hood 46 open upward and slightly forward as they rotate over the forward sloping top edges 52, 54.

The enclosure 22 may also have an opening or hole 72 formed in one of the plurality of sidewalls 30 to provide access to an oil drain tube coupled to the engine in the enclosure. The oil drain tube may extend out of the enclosure 22 through the opening 72 to conveniently drain oil from the engine. However, the opening 72 may alternatively be used to drain gasoline, water, or other fluids from the enclosure 22. The enclosure 22 may also include a removable plug or cover 74 to close the opening 72. FIG. 1 also shows covered openings 76 for airflow and drainage through the base 24 or for lifting straps to wrap around the enclosure 22.

Figure 2:
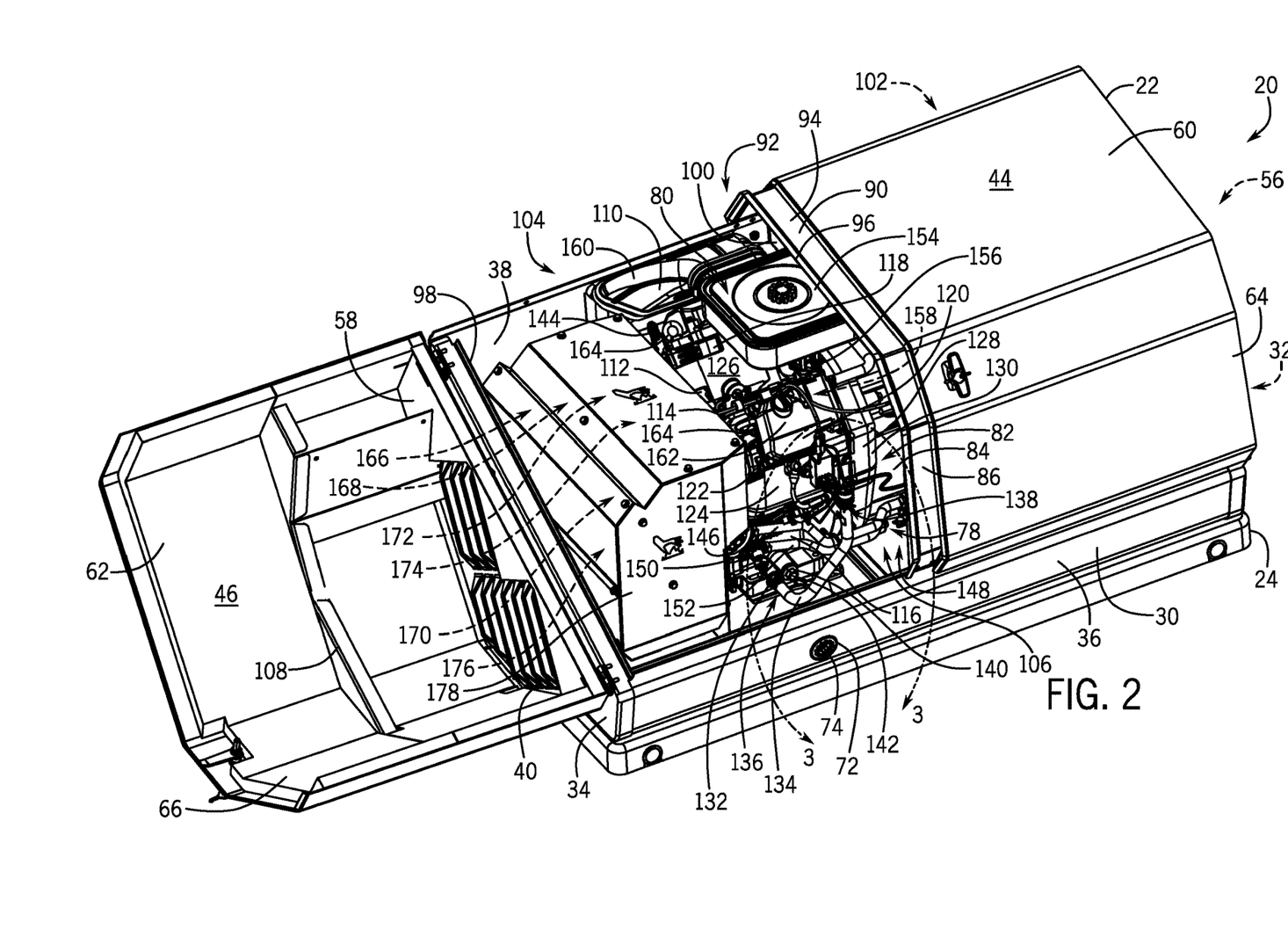
FIG. 2 is a perspective view similar to FIG. 1 with a left hood opened to expose the electrical generator components within, in accordance with an embodiment of the invention.

Referring now to FIG. 2, standby generator 20 is shown having left hood 46 in an open position, according to an embodiment of the invention. With left hood 46 open, an engine-generator set 78 of the standby generator 20 that is positioned within the enclosure 22 is visible. The engine-generator set 78 comprises an engine 80 coupled to drive an alternator 82. The alternator 82 may include an alternator adaptor 84 to couple and align the alternator 82 to the engine 80.

The enclosure 22 may include a support arm 86 that holds the right hood 44 and the left hood 46 when in a closed position. The support arm 86 extends from a back wall 38 over a top of the engine-generator set 78 to the front wall 36 of the enclosure 22. The support arm 86 may have a forward sloping portion 90 and a rearward sloping portion 92 corresponding to sloping portions of the right hood 44 and the left hood 46. In addition, the support arm 86 may provide a gutter 94 between the right hood 44 and the left hood 46 to further channel water off the enclosure 22. The gutter 94 may include rain seals 96 to seal between the right hood 44 and the left hood 46. Rain seals 98 may also be provided along the top edges of the plurality of sidewalls 30 to further seal between the sidewalls and the right hood 44 and the left hood 46.

The enclosure 22 may also include one or more partition walls 100 separating the enclosure into one or more heat and airflow chambers. FIG. 2 shows a partition wall 100 separating the enclosure 22 into a first chamber 102 and a second chamber 104. The partition wall 100 may extend from the back wall 38 to the front wall 36 and from the base 24 to the support arm 86. The partition wall 100 may have an opening 106 that accommodates the engine-generator set 78 such that the alternator 82 extends into the first chamber 102 and the engine 80 extends into the second chamber 104.

Each chamber 102, 104 may include vents 40 to the environment. Airflow through the vents 40 can be used to operate and cool the generator 20. Vents 40 may be located in the right sidewall 32, left sidewall 34, and in side panels 56, 58 of the right hood 44 and the left hood 46. Vents 40 may also be located in the back wall 38, front wall 36, top panels 60, 62, front panels 64, 66, or any other suitable location. The partition wall 100 may extend across the engine-generator set 78 to separate engine cooling air from alternator cooling air thereby limiting heat transfer from the engine 80 to the alternator 82, allowing the alternator to run at a cooler and more efficient temperature. Airflow can be further directed within each chamber by a plurality of partitioning panels 108 on the right hood 44 and the left hood 46 that extend into the respective first chamber 102 and second chamber 104 when the hoods are closed. Accordingly, the enclosure 22 may surround the engine-generator set 78 and associated components to manage heat and air transfer between components in the enclosure.

FIG. 2 shows the engine 80 as a v-twin engine 110 having a pair of cylinders 112, 114 coupled to a crankcase 116, and a pair of cylinder heads 118, 120 coupled to the cylinders. However, the engine 80 may comprise an engine having any number of cylinders, including a single or other multi-cylinder engine. Each cylinder 112, 114 includes a piston that drives a crankshaft in the crankcase 116, which in turn drives the alternator 82 to produce electrical power for distribution from the standby generator 20. The v-twin engine 110 may comprise an air cooled engine having cooling fins 122 located around a periphery of each cylinder 112, 114 and corresponding cylinder head 118, 120. Each cylinder 112, 114 may include an outer air guide 124 and an inner air guide 126 to direct cooling air from an engine fan 128 over the cooling fins 122. The engine fan 128 may be driven by the crankshaft and located within a fan cover 130, which protects the fan and directs cooling air to the cylinder heads 118, 120. The fan cover 130 may be coupled to an inlet air duct located behind the engine 80 that leads to an opening in the back wall 38.

The engine 80 preferably includes a first oil drain 132 which may be located near a bottom portion of the crankcase 116. The engine 80 also preferably includes an oil drain tube 134, also referred to as an oil drain conduit, having a first end 136 coupled to the first oil drain 132 and a second end 138 that opens and closes to selectively drain oil from the engine 80. The oil drain tube 134 may be plastic, rubber, metallic, or made from another material or combination of materials. For instance, the oil drain tube may be made from polyvinyl chloride (PVC), acetal, polypropylene, nylon, Teflon®, polycarbonate, polyethylene, ethylene-vinyl acetate (EVA), polytetrafluoroethylene (PTFE), latex, silicone, polyurethane, Buna-N, neoprene, Viton® fluoroelastomer, ethylene propylene diene monomer (EPDM), steel, stainless steel, titanium, brass, nickel, aluminum, copper, glass, graphite, fiberglass, etc. The oil drain tube 134 could be transparent, semi-transparent, or opaque. The oil drain tube 134 may have marks to indicate an oil fill level of the engine, including a maximum oil fill level. The tube could be flexible, rigid, or contain portions that are rigid and portions that are flexible. For instance, the oil drain tube 134 may comprise a rigid hose that that is rotatable between positions via a rotating fitting at the first end 136, with the opening 72 in the plurality of sidewalls 30 sized and located to receive the rigid hose rotating about the fitting.

The engine 80 may include a second oil drain 140 having an oil drain plug 142, with the second oil drain 140 being positioned adjacent first oil drain 132 near a bottom portion/end of engine 80, according to one embodiment. The oil drain plug 142 can be removed to drain oil from the engine 80 separately from the first oil drain 132 and oil drain tube 134. The engine 80 may also include an oil dipstick 144 to check engine oil level. The oil dipstick 144 includes an indicator line to indicate an oil fill level of the engine 80, including a maximum oil fill level. In addition, the engine 80 may include an oil filter adaptor 146 for an oil filter. The oil filter adaptor 146 couples to an oil cooler 148 by a pair of oil line hoses 150, 152.

The opening 72 in one of the plurality of sidewalls 30 of enclosure 22 is positioned to receive the oil drain tube 134 from the engine 80. The oil drain tube 134 may be flexible to extend and retract the second end 138 through the opening 72 in the plurality of sidewalls 30 of the enclosure 22. The opening 72 may be located in a front wall 36 of the standby generator 20, and FIG. 2 shows the opening 72 in the left side of the front wall 36 of the enclosure 22. The right hood 44 and the left hood 46 open to allow operator access to the oil drain tube 134 from the front of the enclosure 22 so that the operator can insert the oil drain tube 134 through the opening 72 and change engine oil. However, the opening 72 may be located in the right side of the front wall 36, or in another one of the sidewalls 30. For instance the opening 72 may be located in the right sidewall 32, left sidewall 34, or back wall 38 of the enclosure 22. The front wall 36 may have a removable cover 74 to close the opening 72.

In one embodiment of the invention, the engine 80 may include an air filter 154 located on a top portion of the engine. The air filter 154 provides filtered air to a carburetor or to a fuel and air mixer 156. The fuel and air mixer 156 combines fuel and air which is supplied to each cylinder 112, 114 through an intake port 158 in each cylinder head 118, 120. The air filter 154 receives air through an air duct 160 coupled to an opening in the back wall 38 of the enclosure 22. The top portion of the engine 80 may also include a rocker box 162, and a pair of eye bolts 164 for lifting the engine.

In one embodiment of the invention, the engine 80 may include an exhaust system 166 extending outwards from the engine 80 in a direction downstream from the engine fan 128. The exhaust system 166 may include a first and a second exhaust pipe 168, 170 each coupled to a respective outlet port 172, 174 of cylinder heads 118, 120. The exhaust pipes 168, 170 couple to one or more mufflers 176 housed in a muffler enclosure 178. The muffler enclosure 178 may include an opening facing the engine 80 to receive the exhaust pipes 168, 170 and to funnel engine cooling air over the muffler 176 before expelling the air out of the enclosure 22 through vents 40.

Figure 3:
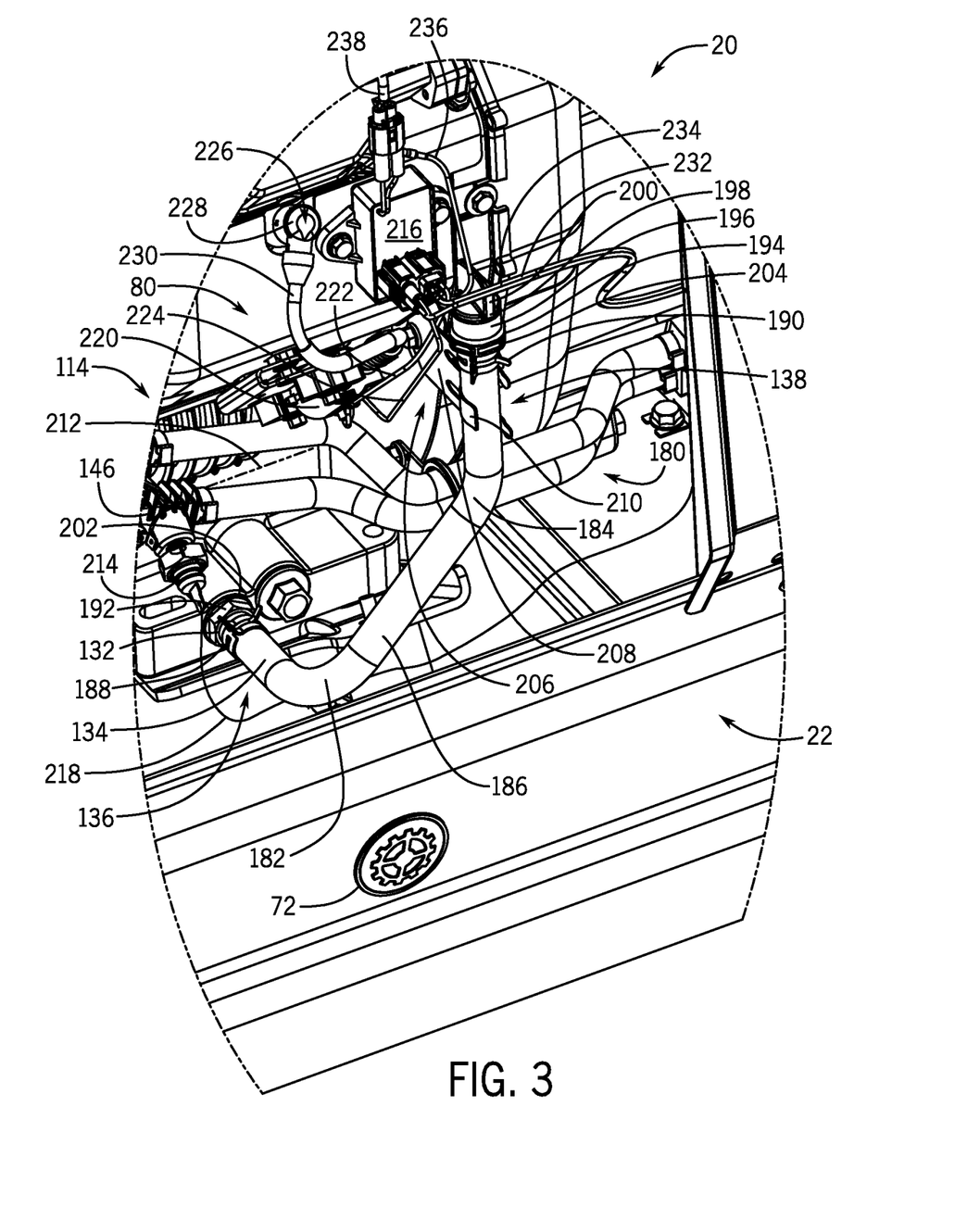
FIG. 3 is a detail view of a portion of the generator of FIG. 2 taken along line 3-3 showing an oil drain tube coupled to an engine, in accordance with an embodiment of the invention.

Referring now to FIG. 3, a detail view of the standby generator 20 of FIG. 2 taken along line 3-3 shows oil drain tube or conduit 134 coupled to the first oil drain 132 of the engine 80, in accordance with an embodiment of the invention. As seen therein, first end 136 of oil drain conduit 134 is coupled to the first oil drain 132 to receive oil therefrom and second end 138 of the oil drain conduit 134 is held in a first or upper position 180. When the oil drain conduit 134 is in the first or upper position 180, the oil drain conduit 134 may extend horizontally from the engine 80 at the first end 136 and vertically at the second end 138. The oil drain conduit 134 may include a ninety degree elbow 182 and a forty-five degree elbow 184 so that second end 138 can be held adjacent the engine.

The oil drain conduit 134 may comprise a hose 186 with hose clamps 188, 190 at both ends coupling each end to a respective fitting 192, 194. The fitting 192 at the first end 136 may be threaded into the first oil drain 132. The fitting 194 at the second end 138 may connect to a stop 196 at the second end to selectively close the oil drain conduit 134. The stop 196 may comprise one of a plug 198 and a cap 200, or another component, to close the second end 138. The fitting 194 at the second end 138 may have internal or external threads to connect to the plug 198 or cap 200. The oil drain conduit 134 may include a quick connect fitting 202, 204 at one or more of the first end 136 and the second end 138. The quick connect fittings 202, 204 allows a person to quickly install or uninstall the oil drain tube 134 at the engine 80, and quickly install or uninstall the stop 196 (i.e. cap, plug, etc.) at the second end 138.

A holding mechanism 206, also referred to as an oil tube holder, may couple to the engine 80 to selectively hold the oil drain conduit 134 in the upper position 180. The holding mechanism 206 may comprise a bracket 208 with a clasp 210 at one end of the bracket to hold the oil drain conduit 134. In one embodiment, the engine 80 may comprise a bracket 208 mounted to the engine that selectively holds the second end 138 in the upper position 180 within the enclosure 22 above a maximum oil fill level 212 of the engine 80. When the second end 138 is above a maximum oil fill level 212 in the engine 80, engine oil is prevented from draining through the oil drain conduit 134 if the plug 198 or cap 200 is dislodged. However, the plug 198 or cap 200 may retain oil in the engine 80 for standby generator operation with the oil drain tube 134 released from the holding mechanism 206. While the oil drain tube 134 in the upper position 180 may be preferable for engine 80 operation, the oil drain tube 134 can be released from the holding mechanism 206 and conveniently inserted through opening 72 in the enclosure 22 to facilitate oil changes.

As further shown in FIG. 3, the oil filter adaptor 146 of engine 80 may couple to a low oil shut-down switch 214. The low oil shutdown switch 214 is wired to an ignition module 216 via a low oil shutdown wire 218. The ignition module 216 can shut down the engine 80 upon the low oil shutdown switch 214 sensing a low level of oil in the engine. That is, the ignition module 216 is wired to an ignition coil 220 for each cylinder 112 (FIG. 2), 114 via a pair of ignition coil wires 222, 224. The ignition coil 220 powers a spark plug 226 via an ignition cap 228 and another ignition coil wire 230. The ignition module 216 also couples to a battery wire 232, an ignition kill switch wire 234, a grounding wire 236, and an inductive sensor wire 238.

Figure 4:
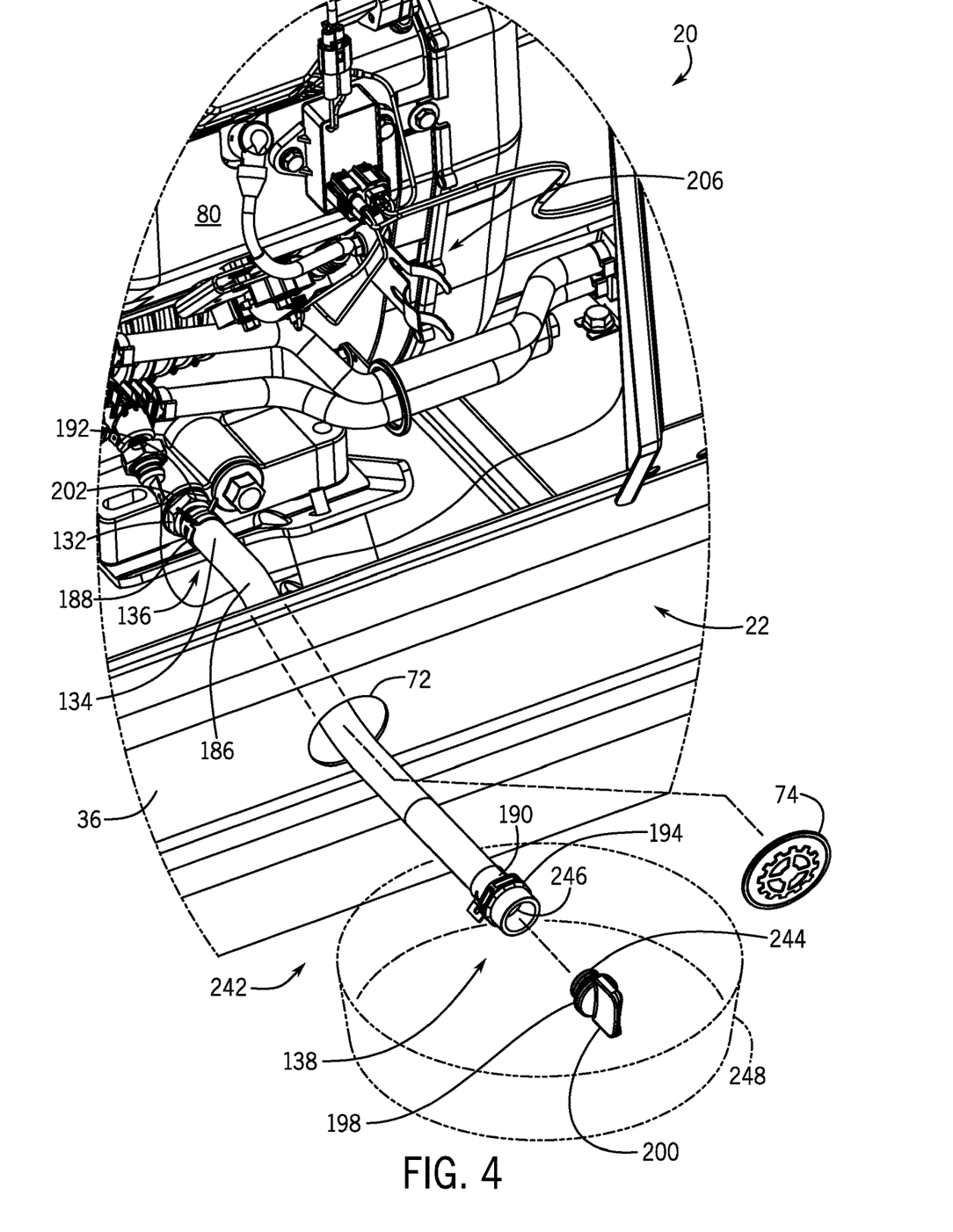
FIG. 4 is a detail view similar to FIG. 3 showing the oil drain tube extending through an opening in a front wall of the generator with a cap detached from the oil drain tube, in accordance with an embodiment of the invention.

Referring now to FIG. 4, a detail view of the standby generator 20 shows oil drain tube 134 extending through opening 72 in front wall 36 of the generator, in accordance with an embodiment of the invention. In FIG. 4, the oil drain tube 134 is in a second or lower position 242, with the oil drain tube 134 extending through the opening 72 in the front wall 36 and with the cap 200 detached from the oil drain tube 134, to facilitate changing oil from the engine 80. As previously set forth, the oil tube 134 may comprise a hose 186 with a fitting 192 at the first end 136 coupled to the first oil drain 132 and a fitting 194 at the second end 138 coupled to an end plug 198 or end cap 200. In one embodiment, the fitting 192 at the first end 136 of the oil drain tube 134 may be a quick disconnect hose coupling 202 selectively connectable to the first oil drain 132. The quick disconnect hose coupling 202 may be coupled to the oil drain tube 134 using a hose clamp 188. The fitting 194 at the second end 138 and the plug 198 or cap 200 may have mating threads 244, 246 and the fitting 194 may be coupled to the oil drain tube 134 at the second end 138 using a hose clamp 190.

As can be seen in FIG. 4, when the oil drain tube 134 is released from the holding mechanism 206 and moved to the second position 242, the second end 138 of oil tube 134 is lower than the first end 136. When the oil drain tube 134 is in the second position 242, the oil drain tube may be extended out through the opening 72 of enclosure 22 by removing the cover 74 from the opening 72 and inserting the oil drain tube 134 through the opening 72. An oil pan 248 can be placed under the second end 138 of the oil drain tube 134 outside of the enclosure 22 to catch oil drained from the engine 80.

Figure 5:
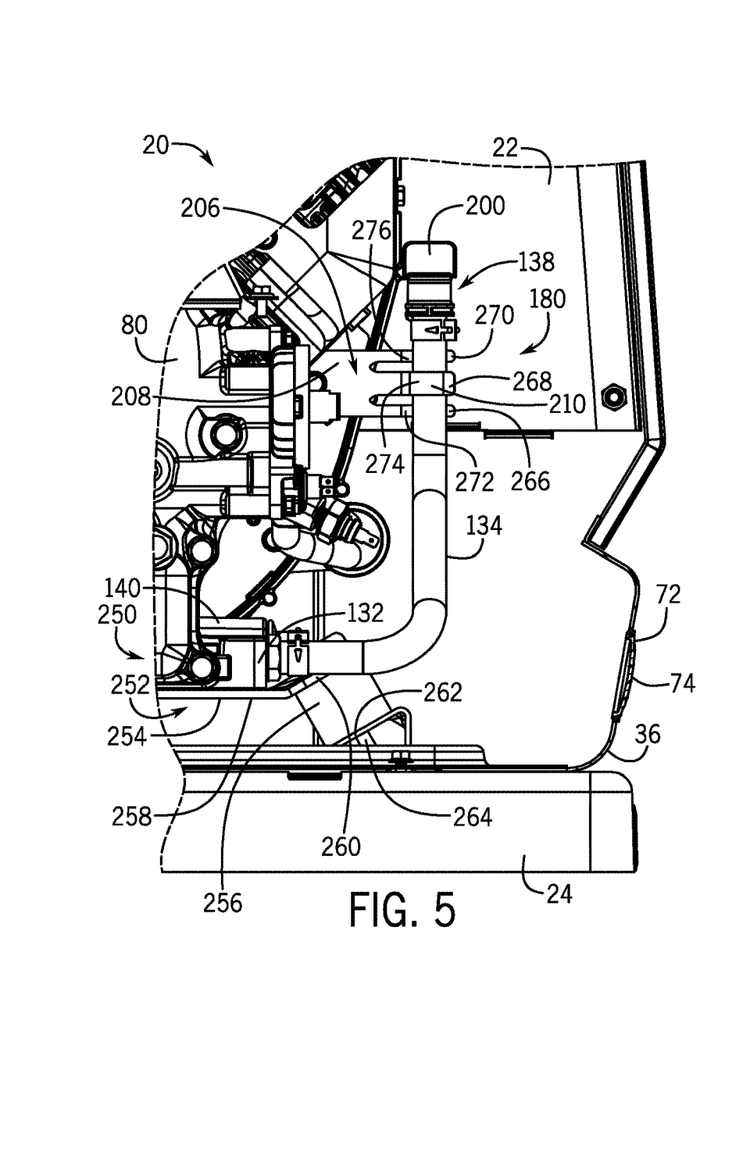
FIG. 5 is a partial cross-sectional view of the electrical generator of FIG. 1 showing an oil drain tube with a first end coupled to an oil drain of an engine and a second end within a holding mechanism coupled to the engine, in accordance with an embodiment of the invention.

Referring now to FIG. 5, a partial cross-sectional view of the standby generator 20 shows engine 80 mounted on an engine base 252 to form an engine assembly 250. The engine base 252 may include a bracket 254 mounted to a plurality of standoffs 256. The bracket 254 may have a flat component 258 mounted to a bottom of the engine 80, and one or more an angled components 260 mounted to the plurality of standoffs 256 such that the standoffs are angled toward an axis of the engine crankshaft. The standoffs 256 rest on one or more angled brackets 262 coupled to the base 24 of the enclosure 22. To couple the engine 80 to the base 24 of the enclosure 22, a plurality of bolts 264 may extend through the angled bracket 262, the standoffs 256, and the engine base bracket 254. The plurality of standoffs 256 may provide vibration isolation between the engine 80 and other components within the enclosure 22, and the first oil drain 132 and the second oil drain 140 may be supported slightly above the enclosure base 24 by the engine base 252.

As shown in FIG. 5, the oil tube holder 206 coupled to the engine 80 selectively holds the oil tube 134 in the first position 180. The bracket 208 of oil tube holder 206 is mounted to the engine 80 with clasp 210 to hold the oil tube 134, and the clasp 210 may have three flexible fingers 266, 268, 270 that hold the oil tube 134 between the fingers. The bracket 208 may be mounted to the engine 80 such that the three fingers 266, 268, 270 are positioned with an inner finger 268 between an upper outer finger 270 and a lower outer finger 266. The three fingers 266, 268, 270 flex slightly to accept the oil tube 134 between the inner finger 268 on a first side and the outer fingers 266, 270 on a second side of the tube. The three fingers 266, 268, 270 may each have a respective curved portion 272, 274, 276 that wraps around the oil tube 134 and applies pressure to hold the tube between the fingers. The outer fingers 266, 270 may have a respective curved portion 272, 276 opposing the curved portion 274 of the inner finger 268.

To move the oil drain tube 134 from the lower position 242 (FIG. 4) to the upper position 180 (FIG. 5), the second end 138 of oil drain tube 134 may be moved into the enclosure 22 through the opening 72 in the front wall 36. The oil drain tube 134 can then be inserted between the fingers 266, 268, 270 of the bracket 208 and held in the upper position 180. The upper position 180 may be located at a height above a maximum oil fill level of the engine 80 to prevent unanticipated oil leaks out the second end 138. The cap 200 can be placed on the oil drain tube 134 and the cover 74 can be placed over the opening 72 in the front wall 36.

Figure 6:
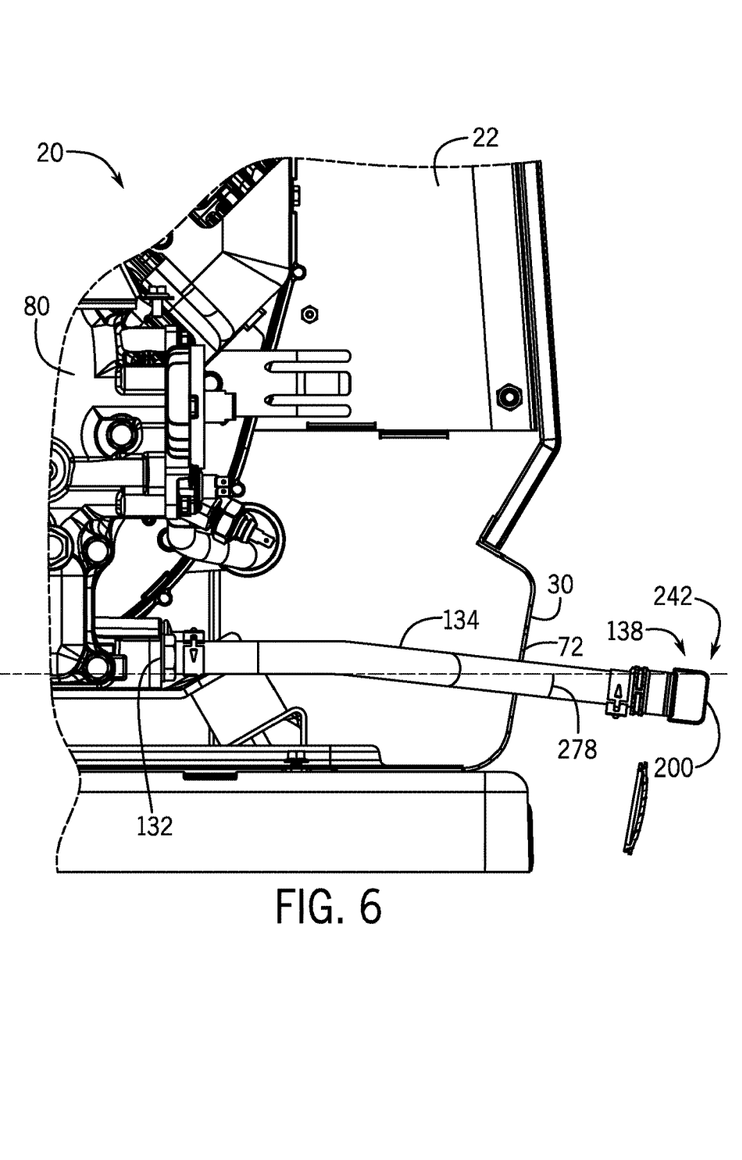
FIG. 6 is a partial cross-sectional view similar to FIG. 5 with the second end of the oil drain tube inserted through an opening in a front wall of the generator, in accordance with an embodiment of the invention.

Referring now to FIG. 6, a partial cross-sectional view of the standby generator 20 shows the second end 138 of the oil drain tube 134 in the lower position 242, in accordance with an embodiment of the invention. The lower position 242 may be located at a height lower than the first oil drain 132, with the second end 138 extending out of the enclosure 22 through the opening 72 when in the lower position 242. When in the lower position 242, the oil drain tube 134 may extend through the opening 72 at a downward angle 278. The cap 200 on the second end 138 can be removed from the oil drain tube 134 to drain oil from the engine 80. The downward angle 278 allows all of the engine oil to be drained from the engine 80 to the level of the first oil drain 132. Accordingly, the opening 72 in one of the sidewalls 30 may be lower than the first oil drain 132 such that the oil drain tube 134 is positioned with a downward angle when extending from the first oil drain 132 and out of the enclosure 22 through the opening 72.

Figures 7, 8:
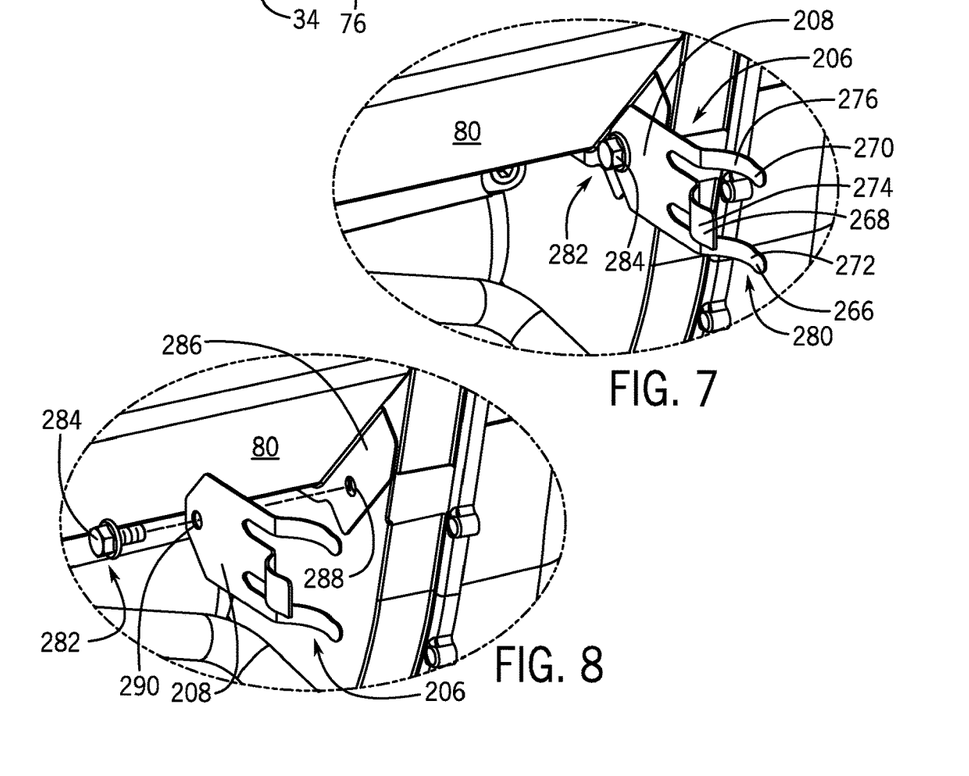
FIG. 7 is a detail view of a portion of the generator of FIG. 2 about a holding mechanism coupled to the engine for an oil drain tube, in accordance with an embodiment of the invention.
FIG. 8 is a detail view similar to FIG. 7 with the holding mechanism and a fastener for the holding mechanism exploded from the engine, in accordance with an embodiment of the invention.

Referring now to FIG. 7, a detail view of holding mechanism 206 for holding oil drain tube 134 is shown, according to an embodiment of the invention. The holding mechanism 206 comprises bracket 208 having a hose clamp 280 formed thereon, with hose clamp 280 having three or more fingers 266, 268, 270. The bracket 208 may be a stamped component from sheet metal, with the three fingers 266, 268, 270 of hose clamp 280 each bent to form curves portions 272, 274, 276 that wrap around the oil drain tube. The three fingers 266, 268, 270 may be in vertical succession, with the outer fingers 266, 270 having curve portions 272, 276 that oppose the curved portion 274 of the inner finger 268. The distance between opposing curves 272, 274, 276 may be slightly smaller than the oil drain tube so that the fingers 266, 268, 270 exert pressure to hold the tube therebetween. The inner finger 268 may be wider than the outer fingers 266, 270 to balance clamping strength on opposing sides of the oil drain tube. While FIG. 7 shows the bracket 208 having three fingers, the bracket 208 may have 1, 2, 3, 4, 5 or any number of fingers sufficient to hold the oil drain tube. The bracket 208 may be mounted to the engine 80 with one or more fasteners 282, for instance one or more bolts or screws 284.

Referring now to FIG. 8, a detail view of holding mechanism 206 and fastener(s) 282 for the holding mechanism are shown exploded from the engine 80, according to an embodiment of the invention. The engine 80 may include a flange 286 with one or more openings 288 that receive the fastener(s) 282 to mount the bracket 208 to the engine 80. The bracket 208 may have one or more openings 290 for the fastener(s) 282 corresponding to the one or more openings 288 on the engine 80. The fastener(s) 282 may comprise a flanged hex head screw 284.

Figure 9:
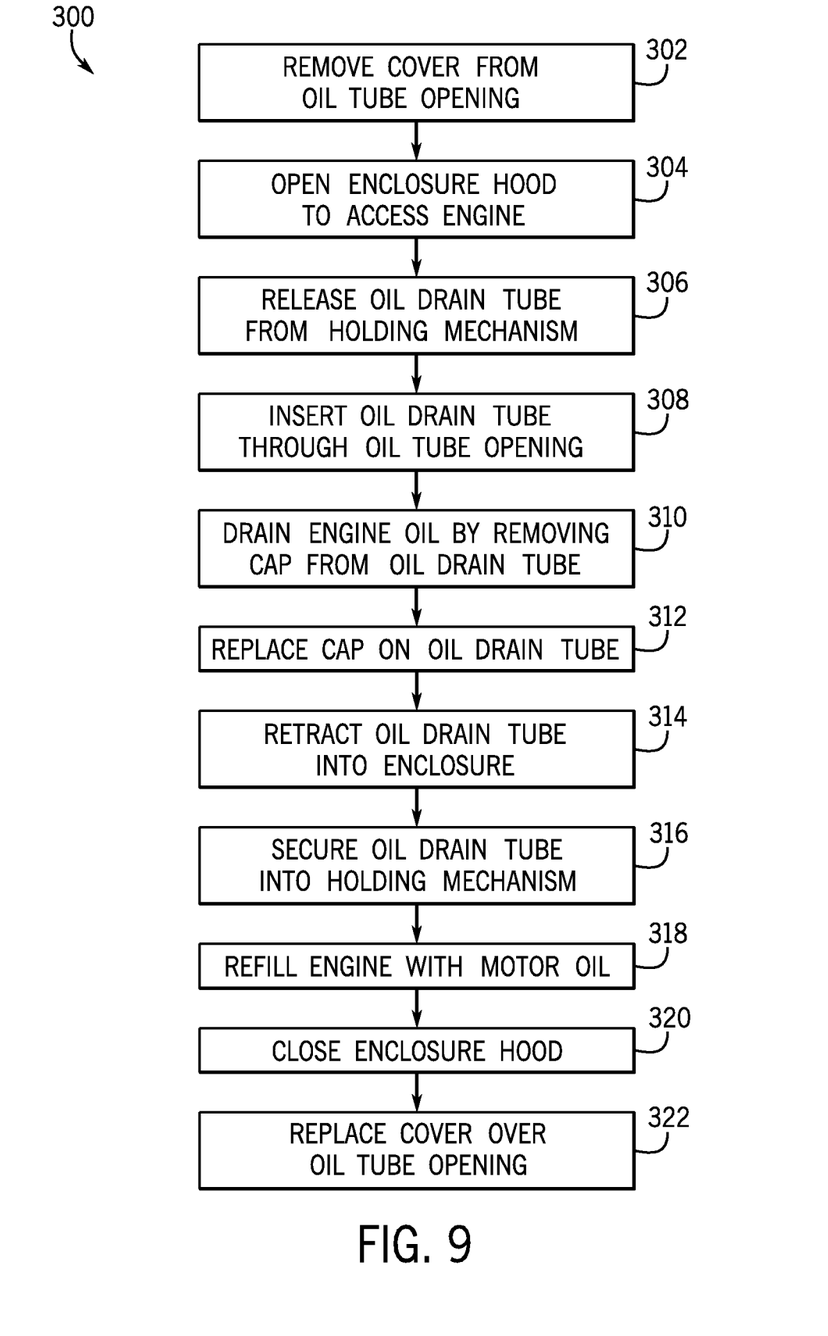
FIG. 9 is a flowchart illustrating steps in changing oil from an engine used to drive an alternator in the standby generator of FIG. 1, in accordance with an embodiment of the invention.

Referring now to FIG. 9, and with continued reference back to FIGS. 2-4, a flow diagram of a process 300 used to change oil from an engine 80 in a standby generator 20 is illustrated, in accordance with an embodiment of the invention. The process 300 begins at STEP 302 by removing a cover 74 to an opening 72 in the front wall 36 of the enclosure 22. The opening 72 is sized and positioned to receive an oil drain tube 134 coupled to the engine 80 that can be used to drain engine oil from the enclosure 22. The process 300 continues at STEP 304 by opening one or more of the enclosure hoods 44, 46 to access the engine 80 within the enclosure 22. The engine 80 has a first oil drain 132 coupled to a first end 136 of an oil drain tube 134. The engine 80 also has a holding mechanism 206 comprising a bracket 208 with a clasp 210 to selectively hold the second end 138 of the oil drain tube 134. The holding mechanism 206 may hold the second end 138 higher than a maximum oil fill level 212 of the engine 80. The process 300 continues at STEP 306 by releasing the oil drain tube 134 from the holding mechanism 206. Alternatively, the opening 72 in the front wall 36 could be uncovered after opening one or more of the enclosure hoods 44, 46 or after releasing the oil drain tube 134 from the holding mechanism 206.

The process 300 continues at STEP 308 by inserting the oil drain tube 134 through the oil tube opening 72 in the front wall 36 of the enclosure 22. That is, the oil drain tube 134 may be flexible between the upper position 180 where the second end 138 is held by the holding mechanism 206, and the lower position 242 where the second end 138 extends through the opening 72 in the front wall 36. The oil drain tube 134 may be positioned with a downward angle having the second end 138 lower than the first oil drain 132 when in the lower position 242. The process 300 continues at STEP 310 by removing the cap 200 from the oil drain tube 134 to drain oil from the engine 80. The oil drain tube 134 can drain the engine oil to the level of the first oil drain 132 when extending from the engine 80 in a downward angle out of the enclosure 22. The oil drained from the engine 80 may be conveniently drained into an oil pan 248 located outside of the enclosure 22.

After draining oil from the engine 80, the oil drain tube 134 can be repositioned within the enclosure 22 in the upper position 180 and the engine 80 replaced with oil. Accordingly, process 300 continues at STEP 312 by replacing the cap 200 on the oil drain tube 134. The cap 200 may thread onto a fitting 194 located at the second end 138 of the oil drain tube 134. The process 300 continues at STEP 314 by retracting the oil drain tube 134 through the opening 72 in the front wall 36. The process continues at STEP 316 by securing the oil drain tube 134 in the holding mechanism 206. Alternatively, the cap 200 can be replaced on the oil drain tube 134 after the oil drain tube 134 is retracted into the enclosure 22, or after securing the oil drain tube 134 in the holding mechanism 206.

The process continues at STEP 318 by refilling the engine 80 with motor oil. The engine 80 is preferably refilled with motor oil to a level not higher than a maximum oil fill level of the engine. The oil drain tube 134 may be positioned in the upper position 180 such that the second end 138 is higher than the maximum oil fill level of the engine 80, and therefore the second end 138 will not leak oil if the cap 200 becomes dislodged. The process 300 continues at STEP 320 by closing any opened enclosure hoods 44, 46, and concludes at STEP 322 by replacing the cover 74 over the opening 72 in the front wall 36. Alternatively, the cover 74 can be replaced prior to securing the oil drain tube 134 in the holding mechanism 206, refilling the engine 80 with motor oil, or closing any opened enclosure hoods 44, 46.

Beneficially, embodiments of the invention provide a standby generator having an enclosure with improved access to an oil drain of an engine used to drive an alternator in the enclosure. The enclosure may include an opening with a removable cover or plug to receive an oil drain tube from the engine. The oil drain tube may have a first end coupled to an oil drain of the engine and a second end with a removable cap to selectively drain oil from the engine. The oil drain tube may be flexible between an upper position where the second end is retained in a holding mechanism located higher than a maximum oil fill level of the engine, and a lower position where the second end extends out of the enclosure through the opening in the front wall—with the oil drain tube being at a downward angle when extending through the opening. The cap can be removed from the second end when the oil drain tube is in the lower position to conveniently drain engine oil from the enclosure.

Therefore, according to one embodiment of the invention, a standby generator includes an enclosure comprising a plurality of sidewalls, with an opening formed in one of the sidewalls. The standby generator also includes an engine positioned within the enclosure, the engine comprising an oil drain, and an oil drain tube having a first end coupled to the oil drain and a second end that opens and closes to selectively drain oil from the engine, the oil drain tube being positionable so as to extend out through the opening. The opening in the one of the sidewalls is lower than the oil drain such that the oil drain tube is positioned with a downward angle when extending from the oil drain and out of the enclosure through the opening.

According to another embodiment of the invention, a standby generator includes a standby generator enclosure comprising a base, a top, and a plurality of sidewalls extending generally vertically from the base to the top, the enclosure having an opening in one of the sidewalls to receive an oil drain conduit. The standby generator also includes an engine mounted to the base in the enclosure, the engine comprising an oil drain and an oil drain conduit having a first end coupled to the oil drain to receive oil therefrom and a second end moveable between an upper position and a lower position, the upper position located at a height above a maximum oil fill level of the engine and the lower position located at a height lower than the oil drain, with the second end extending out of the enclosure through the opening when in the lower position. The engine also comprises a holding mechanism to selectively hold the oil drain conduit in the upper position.

According to yet another embodiment of the invention, an engine assembly includes an engine base and an engine mounted on the engine base. The engine includes an oil drain at a lower end of the engine and a flexible oil tube comprising a first end coupled to receive oil from the oil drain and a second end that opens and closes to selectively drain oil from the engine, wherein the oil tube is flexible between a first position having the second end positioned above a maximum oil level to operate the engine, and a second position having the second end lower than the first end. The engine also includes an oil tube holder coupled to the engine to selectively hold the oil tube in the first position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A standby generator comprising:
   an enclosure comprising a plurality of sidewalls, with an opening formed in one of the sidewalls; and
   an engine positioned within the enclosure, the engine comprising:
      an oil drain, and
      an oil drain tube having a first end coupled to the oil drain and a second end that opens and closes to selectively drain oil from the engine, the oil drain tube being positionable so as to extend out through the opening; and
   wherein the opening in the one of the sidewalls is lower than the oil drain such that the oil drain tube is positioned with a downward angle when extending from the oil drain and out of the enclosure through the opening.

2. The standby generator of claim 1 wherein the oil drain tube is flexible to extend and retract the second end through the opening.

3. The standby generator of claim 2 wherein the engine comprises a bracket mounted thereto to selectively hold the second end in the enclosure above a maximum oil fill level of the engine.

4. The standby generator of claim 3 wherein the oil drain tube comprises a hose and the bracket comprises a hose clamp comprising three or more fingers.

5. The standby generator of claim 1 further comprising a fitting and a plug having mating threads coupled to the oil drain tube at the second end.

6. The standby generator of claim 1 wherein the first end of the oil drain tube comprises a quick disconnect hose coupling selectively connectable to the oil drain.

7. The standby generator of claim 1 wherein the opening in the sidewall is located in a front sidewall of the standby generator.

8. A standby generator comprising:
   a standby generator enclosure comprising a base, a top, and a plurality of sidewalls extending generally vertically from the base to the top, the enclosure having an opening in one of the sidewalls to receive an oil drain conduit;
   an engine mounted to the base in the enclosure, the engine comprising:
      an oil drain;
      an oil drain conduit including:
         a first end coupled to the oil drain to receive oil therefrom; and
         a second end moveable between an upper position and a lower position, the upper position located at a height above a maximum oil fill level of the engine and the lower position located at a height lower than the oil drain, with the second end extending out of the enclosure through the opening when in the lower position; and
      a holding mechanism to selectively hold the oil drain conduit in the upper position.

9. The standby generator of claim 8 wherein the sidewall having the opening comprises a front sidewall of the standby generator.

10. The standby generator of claim 8 wherein, when at the lower position, the oil drain conduit extends through the opening at a downward angle.

11. The standby generator of claim 8 further comprising a stop at the second end to selectively close the oil drain conduit.

12. The standby generator of claim 11 wherein the stop comprises one of a plug and a cap.

13. The standby generator of claim 8 wherein the oil drain conduit comprises a quick connect fitting at one or more of the first end and second end.

14. The standby generator of claim 8 wherein the holding mechanism comprises a clasp to hold the oil drain conduit.

15. The standby generator of claim 8 wherein the oil drain conduit comprises a hose with a hose clamp at both ends.

16. The standby generator of claim 8 further comprising a plug to close the opening in the sidewall when the oil drain conduit is in the upper position.

17. An engine assembly comprising:
   an engine base; and
   an engine mounted on the engine base, the engine comprising:
      an oil drain at a lower end of the engine,
      a flexible oil tube comprising:
         a first end coupled to receive oil from the oil drain, and
         a second end that opens and closes to selectively drain oil from the engine;
         wherein the oil tube is flexible between a first position having the second end positioned above a maximum oil level to operate the engine, and a second position having the second end lower than the first end; and
      an oil tube holder coupled to the engine to selectively hold the oil tube in the first position.

18. The engine assembly of claim 17 wherein the engine base comprises a plurality of standoffs angled toward an axis of the engine crankshaft.

19. The engine assembly of claim 17 wherein, when the oil tube is in the first position, the oil tube extends horizontally at the first end and vertically at the second end.

20. The engine assembly of claim 17 wherein the oil tube comprises a hose with a fitting at the first end coupled to the oil drain and a fitting at the second end coupled to an end plug or end cap.

21. The engine assembly of claim 17 wherein the oil tube holder comprises a bracket mounted to the engine with a clasp to hold the oil tube.

22. The engine assembly of claim 17 wherein the engine is coupled to drive an alternator to produce electrical energy as a standby generator, and
   wherein the oil tube extends through an opening in an outer enclosure of the standby generator when in the second position.

* * * * *